US007575018B2

(12) United States Patent  (10) Patent No.: US 7,575,018 B2
Smith  (45) Date of Patent: Aug. 18, 2009

(54) ALIGNMENT DEVICE FOR VALVE BONNET

(76) Inventor: Michael C. Smith, 2502 Fairview Blvd., Fairview, TN (US) 37062

( * ) Notice: Subject to any disclaimer, the term of this patent is extended or adjusted under 35 U.S.C. 154(b) by 1346 days.

(21) Appl. No.: 10/419,439

(22) Filed: Apr. 21, 2003

(65) Prior Publication Data
US 2004/0206926 A1 Oct. 21, 2004

(51) Int. Cl.
F16K 51/00 (2006.01)
(52) U.S. Cl. .............................. 137/366; 251/293; 403/6
(58) Field of Classification Search .................. 251/291, 251/292, 293, 326; 137/364–367; 403/329, 403/6, 287
See application file for complete search history.

(56) References Cited
U.S. PATENT DOCUMENTS

| 7,440 | A |   | 6/1850 | George |         |
|-------|---|---|--------|--------|---------|
| 70,119 | A | * | 10/1867 | Regester | 137/366 |
| 429,733 | A |   | 6/1890 | Morgan |         |
| 536,268 | A |   | 3/1895 | Cullen |         |
| 820,616 | A | * | 5/1906 | Batt | 137/365 |
| 996,956 | A | * | 7/1911 | Walcott | 137/367 |
| 1,217,814 | A |   | 2/1917 | Parker |       |
| 1,608,772 | A |   | 11/1926 | Cole |         |
| 4,350,177 | A |   | 9/1982 | Firchau et al. | 137/370 |
| 4,405,161 | A | * | 9/1983 | Young et al. | 137/382 |
| 4,534,378 | A |   | 8/1985 | Gagas et al. | 137/367 |
| 4,556,081 | A |   | 12/1985 | Gagas | 137/366 |
| 4,612,680 | A | * | 9/1986 | Daiguji | 14/22 |
| 4,669,305 | A |   | 6/1987 | Rivero-Olmedo | 73/201 |
| 4,819,687 | A |   | 4/1989 | Alberico et al. | 137/367 |
| 4,872,327 | A |   | 10/1989 | Wagner | 70/175 |
| 4,905,725 | A |   | 3/1990 | Sinkinson et al. | 137/370 |
| 5,316,040 | A | * | 5/1994 | Townsend et al. | 137/365 |
| 5,730,180 | A |   | 3/1998 | Alberico | 137/367 |
| D415,052 | S |   | 10/1999 | Mann et al. | D10/103 |
| 6,044,590 | A |   | 4/2000 | Gagas | 52/20 |
| 6,186,475 | B1 | * | 2/2001 | Selepouchin | 251/293 |
| 6,226,929 | B1 |   | 5/2001 | Gagas | 52/20 |
| 6,354,325 | B1 |   | 3/2002 | Warnes et al. | 137/367 |
| 6,449,908 | B2 |   | 9/2002 | Gagas | 52/20 |
| 6,460,563 | B2 | * | 10/2002 | Olson et al. | 137/364 |
| 6,613,011 | B2 | * | 9/2003 | Castellano | 251/149.6 |
| 6,666,238 | B1 | * | 12/2003 | Crowley et al. | 141/286 |

OTHER PUBLICATIONS

Brochure of U.S. Pipe entitled "Metroseal Resilient Seated Gate Valve 18"-36"", (2001).

(Continued)

Primary Examiner—John Bastianelli
(74) Attorney, Agent, or Firm—Stephen T. Belsheim

(57) ABSTRACT

An alignment device for maintaining the relative alignment between a gate valve assembly and a valve bonnet positioned over the gate valve assembly wherein the valve bonnet has an interior surface. The alignment device includes a pair of substantially identical components wherein the components are securely connectable to each other when the alignment device is attached to the gate valve assembly. Each one of the components includes a body that has a peripheral portion. The peripheral portion is adjacent to the interior surface of the valve bonnet when the valve bonnet is positioned over the gate valve assembly. The body also has a transverse edge wherein the transverse edge contains an opening that receives a part of the gate valve assembly when the components are connected together.

12 Claims, 6 Drawing Sheets

OTHER PUBLICATIONS

Brochure of Mueller Co. entitled "Double Disc Gate Valves" 10.3, (Dec. 2001).

Adapter Inc. Products, Valve Box Adaptor, 2 pages printed from Internet Feb. 10, 2003, (2001).

Adaptor Inc., Valve Box Adaptor II, 1 page printed from Internet Feb. 14, 2003, (2001).

Adaptor Inc., Valve Box Adaptor #6, 1 page printed from Internet Feb. 14, 2003, (2001), Posi-Cap Valve Box Aligner, 1 page printed from Internet, (1998).

Clariant, 382 Arbor Court, Winchester VA 22602, Hydrocerol® BIH 25E Chemical Foaming Agent Technical Product Information, 3 pages, (2001).

Masterbatches—Standard Hydrocerol® Foaming Agent Masterbatches, 1 page, (2001).

2001 B&K Industries Inc., Gate Valves, pp. 10-14, (2001).

\* cited by examiner

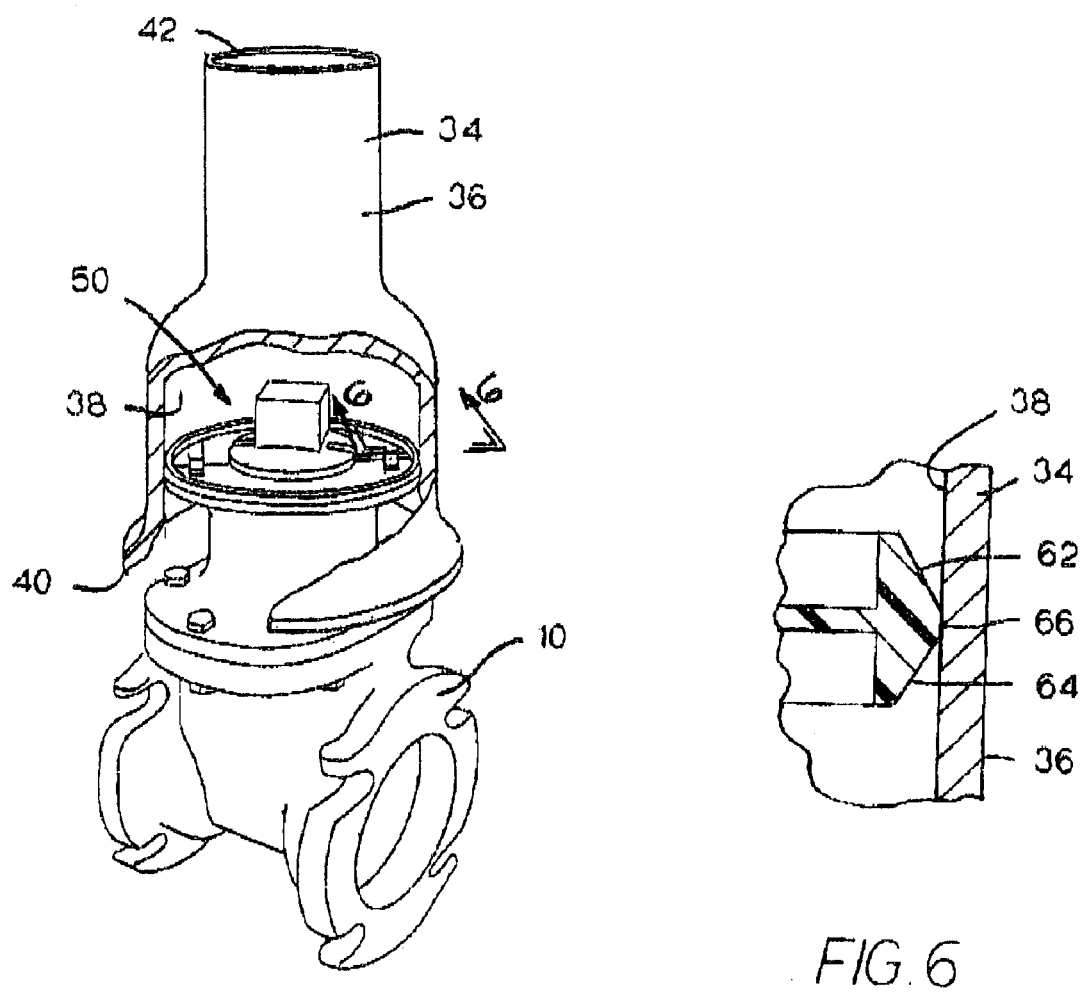
FIG. 5
FIG. 6
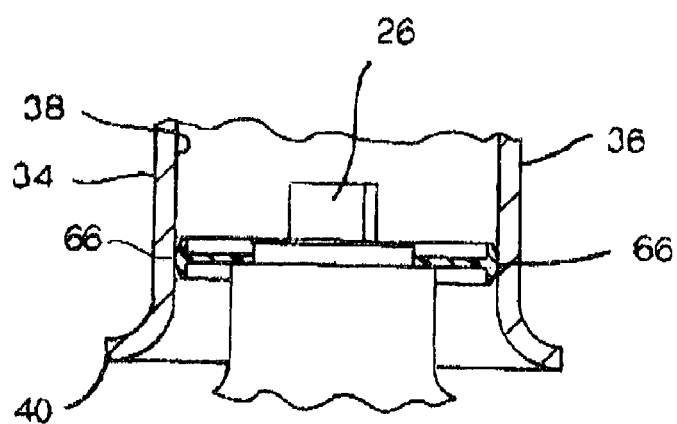
FIG. 7

ALIGNMENT DEVICE FOR VALVE BONNET

BACKGROUND OF THE INVENTION

It is generally the case that a gate valve assembly that is used in a public utility distribution system is located underground. For example, in a water system the pipes typically are installed underground and thus the gate valves are also installed underground. After completion of the installation of a gate valve it is typically the case that a valve bonnet or housing is positioned over the gate valve assembly so as to protect the gate valve assembly from dirt and other contaminants and to access the operating nut to open and close the valve.

It is not unusual for these gate valve assemblies to not require significant maintenance for years. During this period of time it is not unusual for the earth strata to act upon the valve bonnet and the gate valve assembly so as to shift the bonnet relative to the gate valve assembly. When such a shifting occurs, there is a chance that the degree of misalignment between the valve bonnet and the gate valve assembly is great enough to require excavation of the earth strata about that the gate valve assembly so as to obtain access to the gate valve assembly. Obviously, the necessity of excavation is an undesirable situation.

To alleviate the potential for a misalignment to occur, there have been alignment devices that fit over the vale stem of the gate valve assembly. For example, there is a POSI-CAP® valve bonnet alignment disc that is generally circular in shape with an aperture in the center thereof. The POSI-CAP® alignment disc fits onto the gate valve assembly by sliding over the valve stem. The valve bonnet is then lowered into position over the gate valve and the POSI-CAP® alignment disc maintains the alignment between the gate valve assembly and the valve bonnet.

While the POSI-CAP® alignment disc maintains the relative alignment between the valve bonnet and the gate valve assembly, it does require that the valve nut be removed to permit the alignment disc to slide over the valve stem. It would thus be desirable to provide an alignment device that does not require the removal of the gate valve nut to connect the alignment device to the gate valve assembly.

The POSI-CAP® alignment disc does not appear to be able to accommodate valve stems of different diameters. It would therefore be desirable to provide an alignment device that can accommodate valve stems of different diameters.

In another form thereof, the invention is a gate valve assembly that comprises a gate valve stem and an alignment device for maintaining the relative alignment between a gate valve assembly and a valve bonnet when the valve bonnet is positioned over the gate valve assembly. The valve bonnet has interior surface. The alignment device comprises a pair of substantially identical components wherein the components are connectable to each other when the alignment device is attached to the gate valve assembly. Each one of the components comprises a body that has a peripheral portion. The peripheral portion is adjacent to the interior surface of the valve bonnet when the valve bonnet is positioned over the gate valve assembly. The body has a transverse edge wherein the transverse edge contains an opening that receives a part of the gate valve assembly when the components are connected together.

In yet another form, the invention is a component for connection to a substantially identical component wherein the connected components comprise an alignment device for a gate valve assembly. The component comprises a generally semi-circular body that has a peripheral portion wherein the peripheral portion is adjacent to the interior surface of the valve bonnet when the valve bonnet is positioned over the gate valve assembly. The generally semi-circular body has a diametrical edge wherein the diametrical edge contains an opening that receives a part of the gate valve assembly when the components are connected together.

In yet another form thereof, the invention is an alignment device for maintaining the relative alignment between a valve assembly that has an exposed shaft and a valve bonnet positioned over the gate valve assembly wherein the valve bonnet has an interior surface. The alignment device includes a pair of substantially identical components wherein the components are securely connectable to each other when the alignment device is attached to the gate valve assembly. Each one of the components includes a body that has a peripheral portion. The peripheral portion is adjacent to the interior surface of the valve bonnet when the valve bonnet is positioned over the gate valve assembly. The body also has a transverse edge wherein the transverse edge contains an opening. A collar defines the opening. The opening receives the exposed shaft of the gate valve assembly when the components are connected together wherein the collar is adjacent to the exposed shaft.

BRIEF DESCRIPTION OF THE DRAWINGS

Set forth below is a brief description of the drawing figures that make up a part of this patent application:

FIG. 5 is an isometric view of a gate valve assembly that has the specific embodiment of the alignment device of FIG. 1 connected thereto with the valve bonnet positioned on the gate valve and a portion of the valve bonnet is cut away to expose the alignment device;

FIG. 6 is a cross-sectional view taken along section 6-6 of FIG. 5; and

FIG. 7 is a cross-sectional view showing the relationship between the alignment device and the valve bonnet and valve stem.

DETAILED DESCRIPTION

Figure 1:
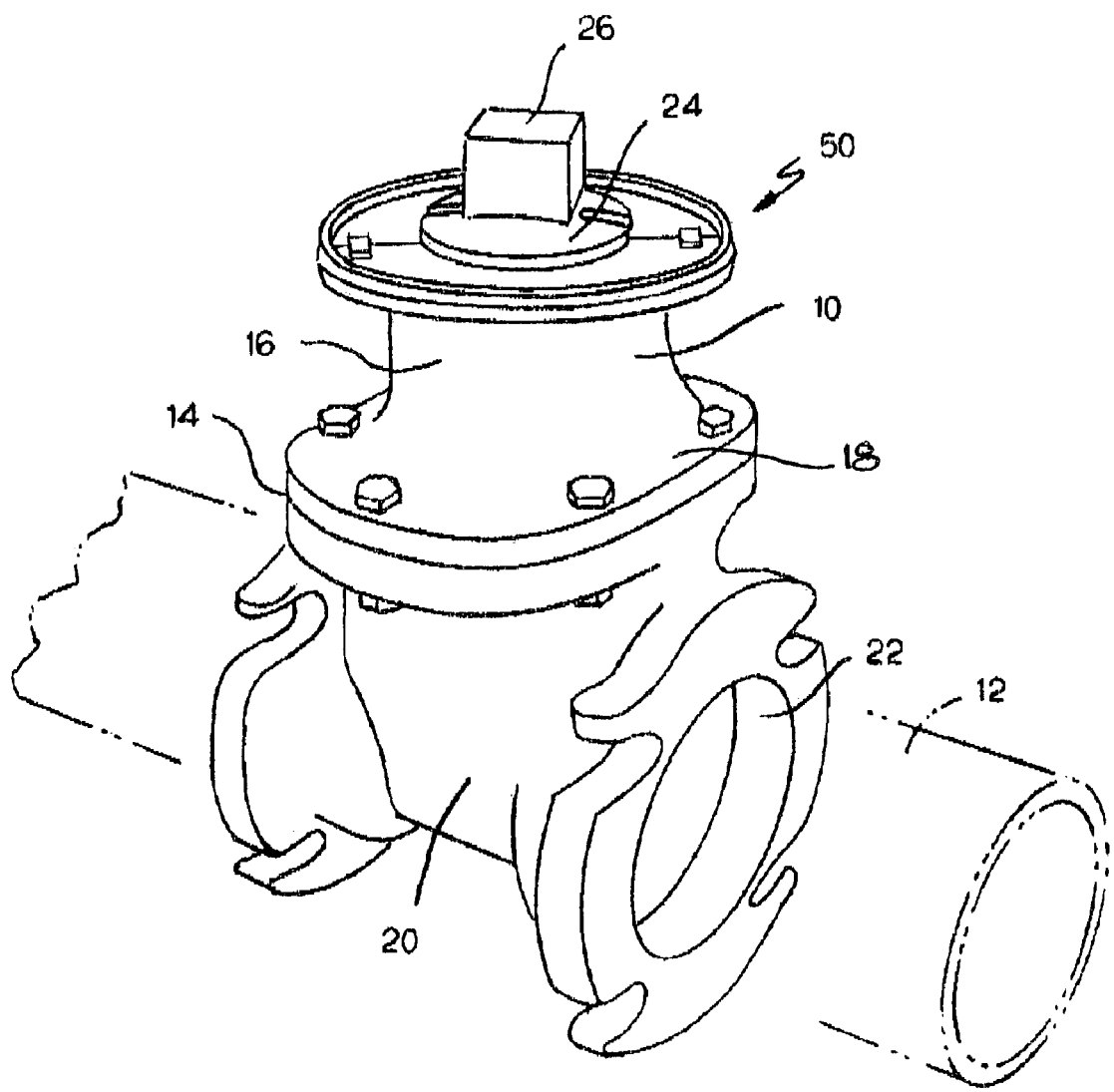
FIG. 1 is an isometric view of a gate valve assembly that has a specific embodiment of the alignment device connected thereto.

Referring to the drawings, FIGS. 1 and 6 illustrate the environment in which the alignment device (generally designated as 50) operates in that there is shown a gate valve assembly 10 that connects to a pipeline 12 and valve bonnet 34 that is over the gate valve assembly 10. In this situation, the gate valve assembly 10 is used in a public water utility distribution system that is located underground. The pipelines 12 are water pipelines. The gate valve assembly 10 controls the flow of water through the pipeline 12.

After completion of the installation of the gate valve assembly 10 it is typically the case that the valve bonnet 34 (or housing) is positioned over the gate valve assembly 10 so as to protect the gate valve assembly 10 from dirt and other contaminants. It is not unusual for these gate valve assemblies 10 to not require significant maintenance for years. During this period of time it is not unusual for the earth strata to act upon the valve bonnet 34 and the gate valve assembly 10 so as to shift the valve bonnet relative 34 to the gate valve assembly 10. When such a shifting occurs, there is a chance that the degree of misalignment between the valve bonnet 34 and the gate valve assembly 10 is great enough to require excavation of the earth strata about that the gate valve assembly 10 so as to obtain access to the gate valve assembly 10. Obviously, the necessity of such excavation is an undesirable situation.

To alleviate the potential for a misalignment to occur, the alignment device 50 is attached to the gate valve assembly 10. The alignment device 50 maintains the relative alignment between the gate valve assembly 10 and the valve bonnet 34 when the valve bonnet 34 is positioned over the gate valve assembly 10.

Referring to the structure of the specific embodiment of the gate valve assembly 10 shown in the drawings, the gate valve assembly 10 has a valve body 14 that has an upper member 16 with a flange 18. The valve body 14 further has a lower member 20 that contains openings 22 wherein the openings receive the pipelines 12. The gate valve assembly 10 also has a valve stem 24 with a nut 26 attached to the distal end of the valve stem 24. It should be appreciated that there is no intention to limit the scope of the claims by reason of the specific gate valve assembly 10 shown in the drawings.

Referring to the structure of the specific embodiment of the valve bonnet 34, the valve bonnet 34 has an external surface 36 and an internal surface 38. The valve bonnet 34 also has a lower edge 40 and an upper edge 42. It should be appreciated that there is no intention to limit the scope of the claims by reason of the specific valve bonnet 34 shown in the drawings.

Figure 2:
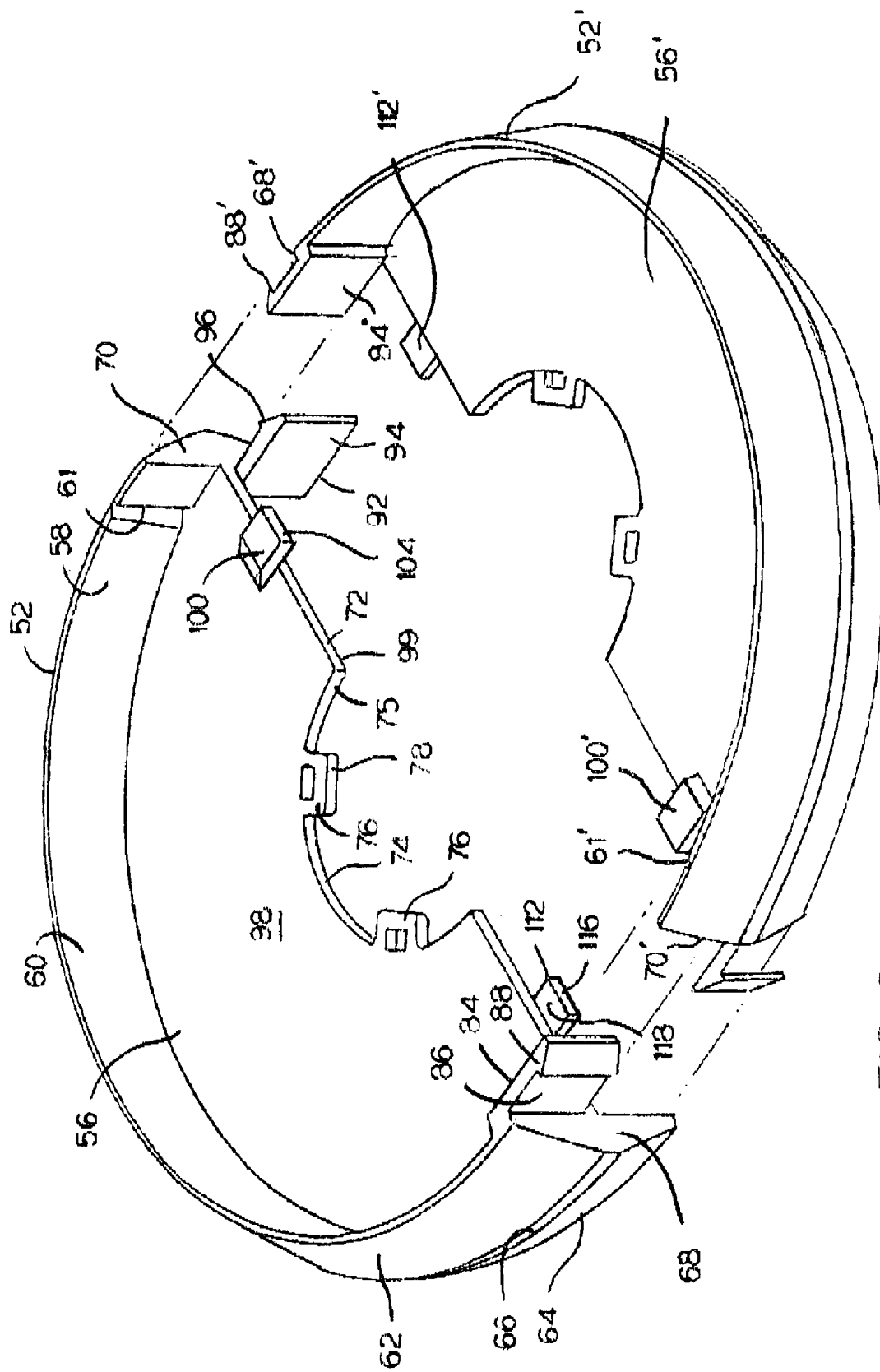
FIG. 2 is an isometric view of the two components of the alignment device illustrated in FIG. 1 wherein the components are spaced apart and in alignment for engagement with one another.

Referring to the structure of the specific embodiment of the alignment device 50, the alignment device 50 includes a pair of substantially identical components 52, 52'. These components 52, 52' are securely connectable to each other when the alignment device 50 is attached to the gate valve assembly 10. FIG. 2 illustrates components 52, 52' in an aligned and spaced apart relationship. This relationship is consistent with the relative positioning of the components 52, 52' before attachment to the gate valve.

Each one of the components 50 comprises a body 56 that has a peripheral portion. In the specific embodiment, the body 56 is of a generally semi-circular shape and the peripheral portion is an upstanding wall 58. The upstanding wall 58 has an interior surface 60 which contains a notch 61 adjacent to each one of the opposite terminal ends 68, 70 of the upstanding wall 58. The interior surface 60 is disposed so as to be generally perpendicular to the surface of the body 56. The upstanding wall 58 has an exterior surface that has an upper acute exterior portion 62 and a lower acute exterior portion 64. The upper acute exterior portion 62 and the lower acute exterior portion 64 intersect to form an apex surface 66 at the intersection. It should be appreciated that the apex surface 66, which is a part of the peripheral portion of the body, is adjacent to the interior surface 38 of the valve bonnet 34 when the valve bonnet 34 is positioned over the gate valve assembly 10 as shown in FIG. 6 and FIG. 7.

The body 56 has a transverse edge which in the context of the semi-circular body 56 is a diametrical edge 72. The diametrical (or transverse edge) 72 contains an opening 74. It should be appreciated that the opening 74 receives a part of the gate valve assembly 10 when the components (52, 52') are connected together.

Still referring to the opening 74, in this specific embodiment it takes on a semi-circular shape. The opening 74 has an edge 75 that at least in part defines the opening 72. A pair (i.e., plurality) of spacers 76 extends from the opening edge 75 wherein each one of the spacers 76 has a distal edge 78. The distal edge 78 has a generally arcuate shape.

The spacers 76 are detachable from the body 56 in that they may be broken off or removed in some fashion. By doing so, the alignment device 50 can accommodate a gate valve assembly with a valve stem with a larger diameter than an alignment device in which the spacers 76 are not removed from the body. Keeping this in mind, it should be appreciated that when the alignment device 50 (with the spacers 76 removed from the body 56) is attached to the gate valve assembly 10 the opening edge 75 is adjacent to the gate valve assembly 10, and in particular adjacent to the valve stem 24 of the gate valve assembly 10. It should also be appreciated that when the alignment device 50 (with the spacers 76 not removed from the body 56) is attached to the gate valve assembly 10 the distal edge 78 of each spacer 76 is adjacent to the gate valve assembly 10, and in particular adjacent to the valve stem 24 of the gate valve assembly 10.

The body 56 further includes one projection 84 that extends from one of the terminal ends 68. The one projection 84 has a body 86 with one finger 88. The body 56 also includes other projection 92 that extends from other of the terminal ends 70 wherein the other projection 92 has a body 94 and other finger 96. It should be appreciated that when the components (52, 52') are connected together, for the one component 52 the finger (88, 96) of each projection (84, 92) registers with its corresponding recess (61') in the upstanding wall 58' of the other component 52'; and for the other component 52' the finger (88', 96') of each projection (84', 92') registers with its corresponding recess (61) in the upstanding wall 58 of the one component 52. The result is to securely connect the components (52, 52') together.

Figure 3:
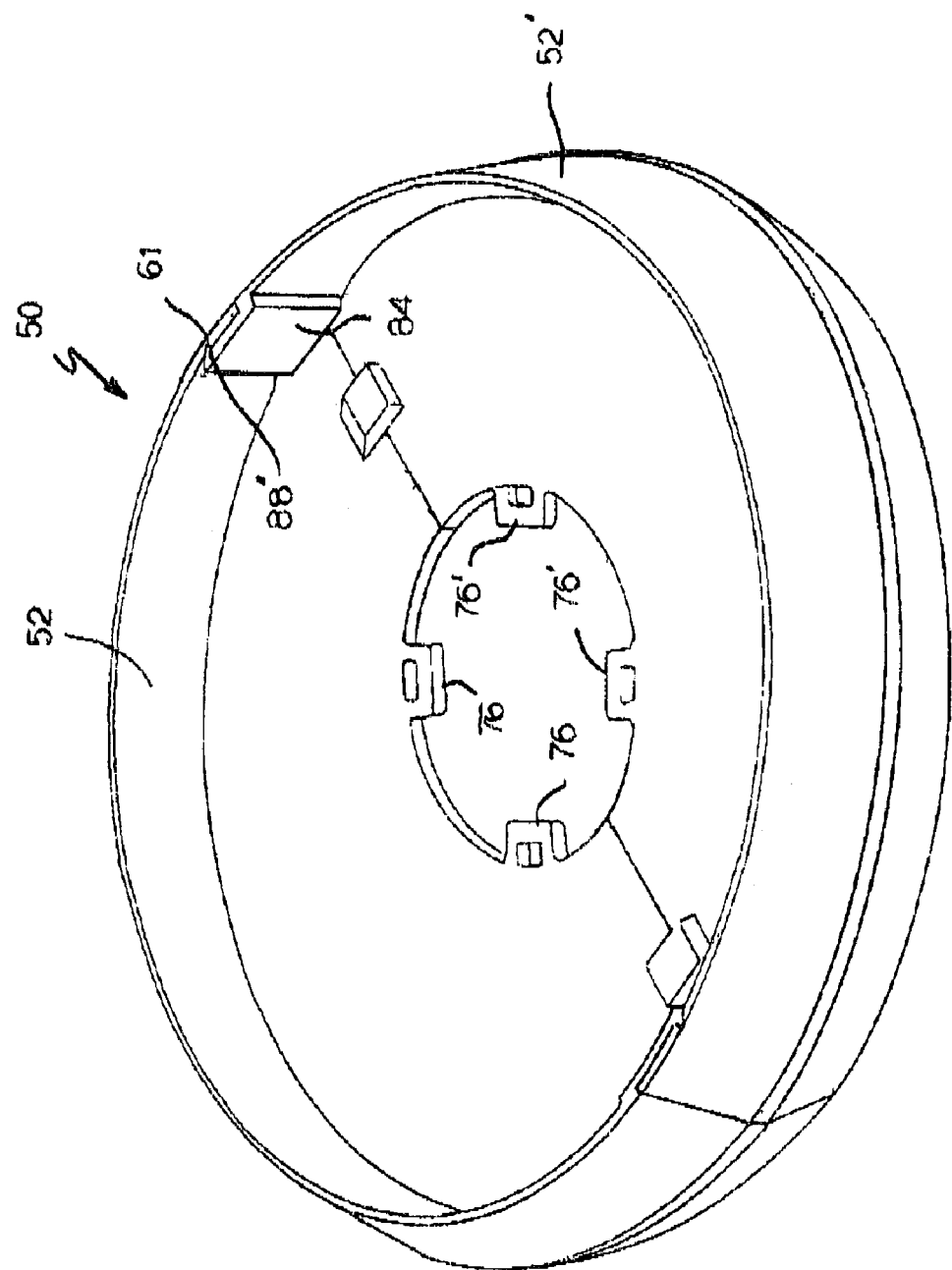
FIG. 3 is an isometric view of the specific embodiment of the alignment device of FIG. 1 wherein the alignment device is adapted to fit a gate valve that has a smaller diameter valve stem.
Figure 4:
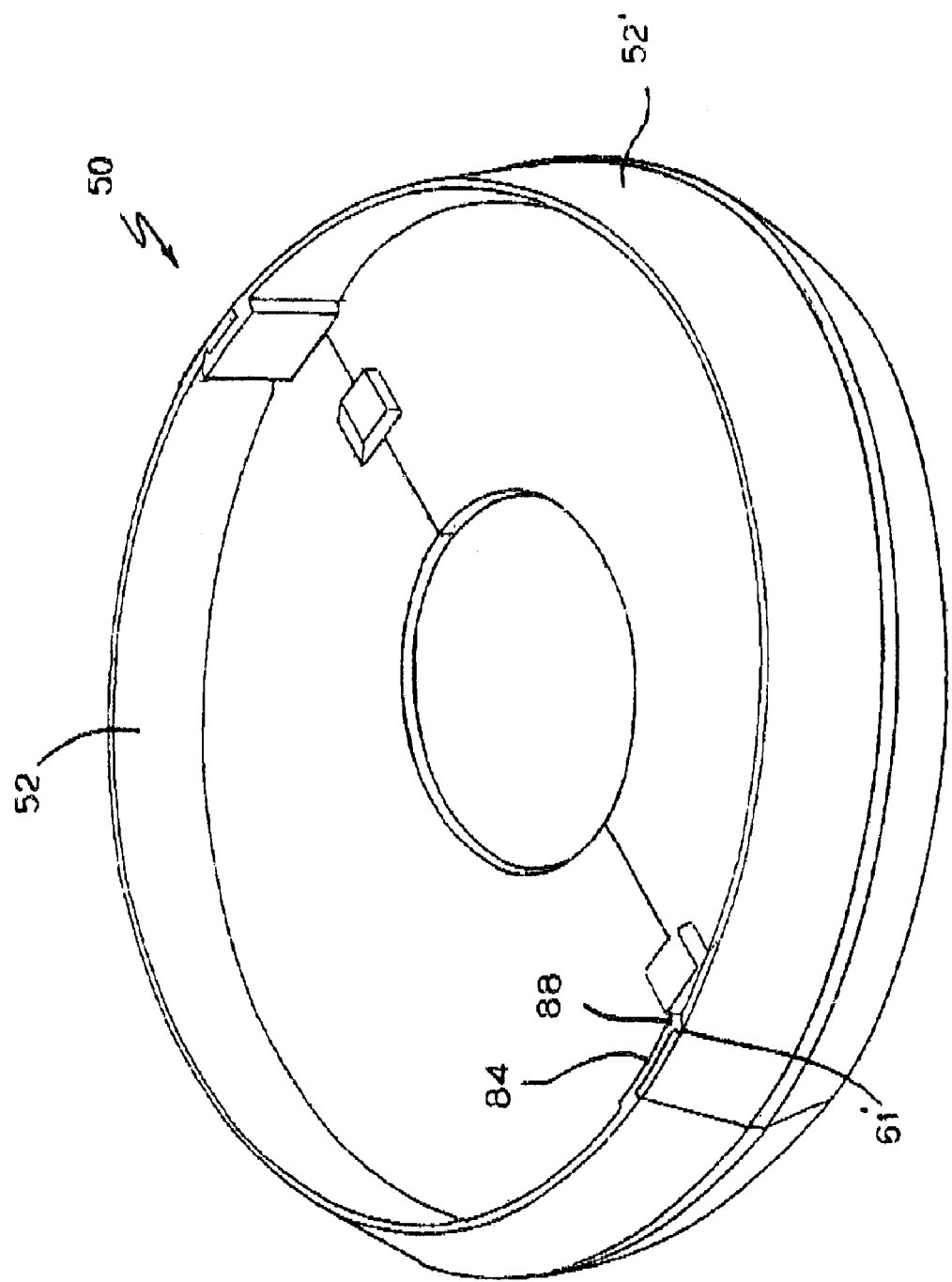
FIG. 4 is an isometric view of the specific embodiment of the alignment device of FIG. 1 wherein the alignment device is adapted to fit a gate valve that has a larger diameter valve stem.

The body 56 further has opposite surfaces 98, 99. One restraint member 100 projects from the one surface 98 of the body 56 in a direction away from the diametrical edge 72. The one restraint member 100 has a body with a distal end 104 and a surface (not illustrated). There is the other restraint member 112 that projects from the other surface 99 of the body 56 in a direction away from the diametrical edge 72. The other restraint member 112 has a body with a distal end 116 and a surface 118 (that preferably is smooth). It should be appreciated that when the components (52, 52') are connected together, the one restraint member 100 of the one component 52 moves in proximity to the other restraint member 112' of the other component 52', and the other restraint member 112 of the one component 52 moves in proximity to the one restraint member 100' of the other component 52'. When the components (52, 52') are in an assembled condition (see FIG. 3), the corresponding one restraint member 100 and the other restraint member 112' function to create abutments relative to their respective adjacent surfaces (98, 99), and the same is true for the one restraint member 100' and the other restraint member 112 in that they also function to create abutments relative to their respective adjacent surfaces (98, 99). These abutments help restrain movement of the components (52, 52') when connected.

The alignment device 50 is made from high density polyethylene (HDPE) and a material sold by Clariant under the designation Hydrocerol® BIH 25E.

Figure 8:
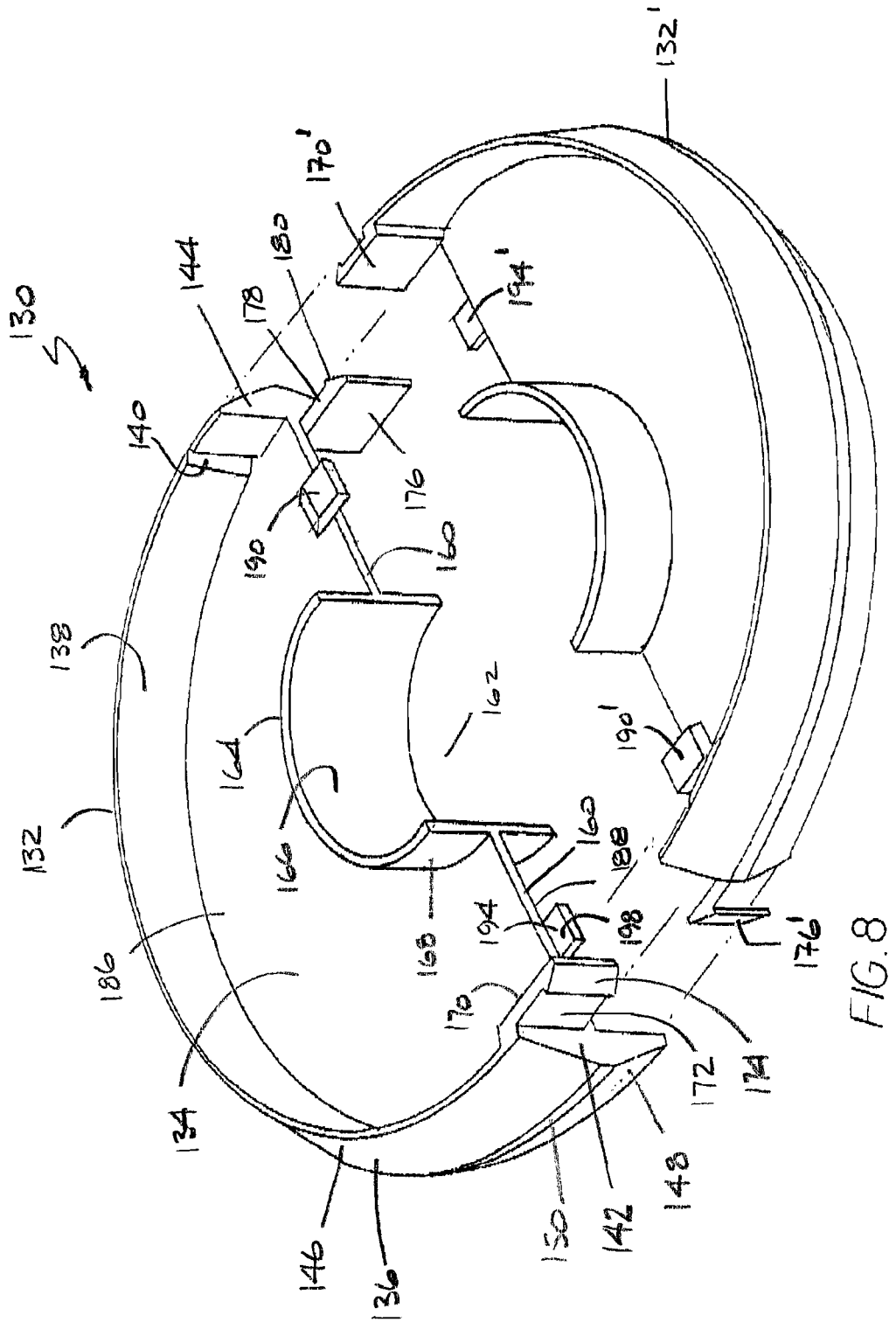
FIG. 8 is an isometric view of another specific embodiment of the alignment device for use with a Kennedy-Mueller style of valve.

Referring to FIG. 8, there is shown another specific embodiment of the alignment disc generally designated as 130. Alignment disc 130 comprises two substantially identical components 132, 132'. Like for the other embodiment of the alignment device 50, the components 132, 132' are securely connectable to each other when the alignment device 130 is attached to a gate valve assembly. This embodiment of the alignment disc 130 is especially designed to attach to a Kennedy-Mueller style of valve that presents an exposed shaft portion. The relationship between the Kennedy-Mueller style of valve and the alignment disc 130 is discussed hereinafter.

FIG. 8 illustrates the components 132, 132' in an aligned and spaced apart relationship. This positioning is consistent with the relative positioning of the components before attachment to the valve.

Each one of the components 132, 132' comprises a body 134 that has a peripheral portion. In the specific embodiment, the body 134 is of a generally semi-circular shape and the peripheral portion is an upstanding wall 136. The upstanding wall 136 has opposite ends 142, 144. Upstanding wall 136 has an interior surface 138 that is disposed so as to be generally perpendicular to the surface of the body 134. The upstanding wall 136 has an exterior surface that has an upper acute exterior portion 146 and a lower acute exterior portion 148 that intersect to form an apex surface 150 which is a part of the peripheral portion of the body. The apex surface 150 is adjacent to the interior surface of the valve bonnet when the valve bonnet is positioned over the valve assembly.

The body 134 has a transverse edge which in the context of the semi-circular body 134 is a diametrical edge 160. The diametrical (or transverse) edge 160 contains an opening 162. It should be appreciated that the opening 162, receives (or is adjacent to) the exposed shaft of the valve assembly when the components 132, 132' are connected together. A semi-circular upstanding collar 164 defines the opening 162. Collar 164 extends above and below the surface of the body 134. Collar 164 has an exterior surface 168, an interior surface 166 and opposite ends. The interior surface 166 of the collar 164 is adjacent to the exposed shaft of the Kennedy-Mueller type of valve assembly. In further reference to the embodiment illustrated in FIG. 8, the body 134 further includes one projection 170 that extends from one of the terminal ends 142. The one projection 170 has a body 172 with one finger 174. The body 134 also includes other projection 176 that extends from other of the terminal ends 144 wherein the other projection 176 has a body 178 and a finger 180. When the components (132, 132') are connected together, for the one component 132 the finger (174, 180) of each projection (170, 176) registers with its corresponding recess in the upstanding wall of the other component 132'; and for the other component 132' the finger of each projection registers with its corresponding recess 140 in the upstanding wall 138 of the one component 132. The result is to securely connect the components (132, 132') together.

The structure of the components (132, 132') is essentially the same as the structure of the components (52, 52'), except for the collar 164. The body 134 further has opposite surfaces 186, 188. One restraint member 190 projects from the one surface 186 of the body 134 in a direction away from the diametrical edge. There is another restraint member 192, which has a smooth surface 198, that projects from the other surface 188 of the body 134 in a direction away from the diametrical edge. These restraint members 190, 192 have a structure like that of the restraint members 100, 112 in the earlier embodiment of the alignment disc. The other component 132' has the projections (170', 176') and the restraint members (190', 194'). The relationship and function between the restraint members (190, 194) of the one component 132 and the restraint members (190', 194') of the other component 132' are the same as the relationship and function between the restraint members (100, 112) of the one component 52 and the restraint members (100', 112') of the other component 52'.

All patents, patent applications, articles and other documents identified herein are hereby incorporated by reference herein.

Other embodiments of the invention may be apparent to those skilled in the art from the consideration of the specification or the practice of the invention disclosed herein. It is intended that the specification and any examples set forth herein be considered as illustrative only, with the true spirit and scope of the invention being indicated by the following claims.

What is claimed is:

1. An alignment device for maintaining the relative alignment between a gate valve assembly and a valve bonnet positioned over the gate valve assembly wherein the valve bonnet has an interior surface, and the alignment device comprises:

a pair of substantially identical components wherein the components are securely connectable to each other when the alignment device is attached to the gate valve assembly;

each one of the components comprises:

a body that has a peripheral portion with a peripheral wall, the peripheral portion is adjacent to the interior surface of the valve bonnet when the valve bonnet is positioned over the gate valve assembly; and the body has a transverse edge, the transverse edge contains an opening that receives a part of the gate valve assembly when the components are connected together wherein the peripheral wall has an exterior surface, and the exterior surface has a pair of acutely disposed surfaces that intersect at an apex and the apex defines a flat surface, and at least a portion of the apex is in contact with the interior surface of the valve bonnet.

2. The alignment device according to claim 1 wherein each one of the components further includes a connector, and the connector engages the other component so as to connect the pair of components together when the alignment device is attached to the gate valve assembly.

3. The alignment device according to claim 1 wherein the transverse edge of the body has a notch that has a notch edge that at least in part defines the opening, and when the alignment device is attached to the gate valve assembly the notch edge is adjacent to the gate valve assembly.

4. The alignment device according to claim 1 wherein the body has a generally semi-circular shape.

5. A gate valve assembly comprising:

a gate valve stem;

an alignment device for maintaining the relative alignment between a gate valve assembly and a valve bonnet when the valve bonnet is positioned over the gate valve assembly, the valve bonnet has interior surface;

the alignment device comprises:

a pair of substantially identical components wherein the components are connectable to each other when the alignment device is attached to the gate valve assembly;

each one of the components comprises:

a body that has a generally arcuate peripheral portion with a peripheral wall, the peripheral portion is adjacent to the interior surface of the valve bonnet when the valve bonnet is positioned over the gate valve assembly;

the body has a diametrical edge wherein the diametrical edge contains an opening that receives a part of the gate valve assembly when the components are connected together;

the body further including one restraint member radially inward of the peripheral portion and extending away from the diametrical edge, and the body further including another restraint member radially inward of the peripheral portion and extending away from the diametrical edge; and when the substantially identical components are connected, the one restraint member of one substantially identical component cooperates with the other restraint member of the other component to restrain movement of the substantially identical components wherein the peripheral wall has an exterior surface, and the exterior surface has a pair of acutely disposed surfaces that intersect at an apex and the apex defines a flat surface, and at least a portion of the apex is in contact with the interior surface of the valve bonnet.

6. The gate vale assembly according to claim 5 wherein each one of the components further includes a connector, and the connector engages the other component so as to securely connect the pair of components together.

7. The gate valve assembly according to claim 5 wherein the peripheral portion of each one of the components comprises an upstanding peripheral wall wherein the wall has opposite terminal ends, and the wall contains a recess adjacent to each one of the terminal ends;

one projection extends from one of the terminal ends, and the one projection has one finger;

other projection extends from other of the terminal ends, and the other projection has other finger;

when the components are connected the finger of each projection registers with its corresponding recess in the upstanding wall so as to secure the components together.

8. The gate valve assembly according to claim 5 wherein the transverse edge of the body of each one of the components has a notch that has a notch edge that at least in part defines the opening, and when the alignment device is attached to the gate valve assembly the notch edge is adjacent to the gate valve stem.

9. The gate valve assembly according to claim 5 wherein the transverse edge of the body has a notch with a notch edge, a plurality of detachable spacers extend from the notch edge, each one of the detachable spacers has a distal edge, and when the alignment device is attached to the gate valve assembly the distal edge of each one of the detachable spacers is adjacent to the gate valve assembly, and wherein the detachable spacers can be in either a detached condition so as to be detached from the body or in an attached condition so as to be attached to the body.

10. An alignment device for maintaining the relative alignment between a valve assembly that has an exposed shaft and a valve bonnet positioned over the gate valve assembly wherein the valve bonnet has an interior surface, and the alignment device comprises:

a pair of substantially identical components wherein the components are securely connectable to each other when the alignment device is attached to the gate valve assembly;

each one of the components comprises:

a body that has a peripheral portion with a peripheral wall, the peripheral portion is adjacent to the interior surface of the valve bonnet when the valve bonnet is positioned over the gate valve assembly; and the body has a transverse edge, the transverse edge contains an opening, a collar defining the opening, the opening receives the exposed shaft of the valve assembly when the components are connected together wherein the collar is adjacent to the exposed shaft wherein the peripheral wall has an exterior surface, and the exterior surface has a pair of acutely disposed surfaces that intersect at an apex and the apex defines a flat surface, and at least a portion of the apex is in contact with the interior surface of the valve bonnet.

11. The alignment device according to claim 1 wherein the body further includes one restraint member radially inward of the peripheral portion and extending away from the transverse edge, and the body further including another restraint member radially inward of the peripheral portion and extending away from the transverse edge; and when the substantially identical components are connected, the one restraint member of one substantially identical component cooperates with the other restraint member of the other component to restrain movement of the substantially identical components.

12. The alignment device according to claim 11 wherein when the substantially identical components are connected, the one restraint member of other substantially identical component cooperates with the other restraint member of the one component to restrain movement of the substantially identical components.

* * * * *